United States Patent [19]
Majos et al.

[11] Patent Number: 5,640,366
[45] Date of Patent: Jun. 17, 1997

[54] SEQUENTIAL-ACCESS ASYNCHRONOUS MEMORY DEVICE AND CORRESPONDING PROCESS FOR STORAGE AND READING

[75] Inventors: Jacques Majos, Le Versoud; Daniel Weil, Grenoble, both of France

[73] Assignee: France Telecom, Paris, France

[21] Appl. No.: 527,137

[22] Filed: Sep. 12, 1995

[30] Foreign Application Priority Data

Oct. 12, 1994 [FR] France .................. 94 1217010

[51] Int. Cl.$^6$ .................................................. G11C 8/00
[52] U.S. Cl. ........................... 365/239; 365/221; 365/236
[58] Field of Search .......................... 365/221, 236, 365/239, 78, 189.07, 233

[56] References Cited

U.S. PATENT DOCUMENTS

| | | | |
|---|---|---|---|
| 5,274,600 | 12/1993 | Ward et al. | 365/221 |
| 5,311,475 | 5/1994 | Huang | 365/221 |
| 5,426,612 | 6/1995 | Ichige et al. | 365/221 X |

FOREIGN PATENT DOCUMENTS

| | | |
|---|---|---|
| 217486 | 4/1987 | European Pat. Off. . |
| 525875 | 2/1993 | European Pat. Off. . |

*Primary Examiner*—Joseph A. Popek
*Attorney, Agent, or Firm*—Robbins, Berliner & Carson, LLP

[57] ABSTRACT

The sequential-access asynchronous memory device comprises an asynchronous double-port random access memory (MVDP), a write address generator (CE) for delivering to the input port of the memory, in response to write enable signals (ATE), successive write address information (ADE) respectively associated with successive data (DE) to be stored sequentially in a predetermined order of writing, a read address generator (CL) for delivering to the output port of the memory, in response to read enable signals (ATL), successive read address information (ADL) respectively associated with successive data (DL) to be read sequentially in a predetermined order of reading, a device for detecting the stability of the address information delivered by the address generators, and a device (GAE, GAL, ST1, ST2) for determining the level of fill of the memory from the stable address information delivered by the address generators.

16 Claims, 4 Drawing Sheets

SEQUENTIAL-ACCESS ASYNCHRONOUS MEMORY DEVICE AND CORRESPONDING PROCESS FOR STORAGE AND READING

BACKGROUND OF THE INVENTION

1. Field of the Invention

The invention relates to sequential-access asynchronous memories, in particular, but not exclusively, asynchronous memories of the first-in first-out type (FIFO).

2. Description of the Related Art

A memory is said to be asynchronous when the incoming and outgoing data streams are gated by independent clocks.

The use of asynchronous FIFO memories in integrated circuits has many advantages, such as notably the adaptation of timing in asynchronous networks, the use of different operating frequencies within circuits, or the smoothing-out of a data stream.

Asynchronous FIFO memories, or "stacks", are already known, conventionally consisting of "overlaid" registers, where, at each cycle time, each word stored in the memory is physically tipped into the next register. As a result of all the registers working at the same time, there is substantial consumption proportional to the size of the memory.

Furthermore, the time of residence of a word in the memory is variable. Thus, it is substantial when the FIFO is of large size and almost empty, whereas it is small when the latter is almost full since an incoming word merely needs to "sit down" on the top of the stack.

Now, this difference in behaviour between a full and an empty stack may create difficulties in certain applications.

The invention aims to afford a solution to these problems.

SUMMARY OF THE INVENTION

The object of the invention is to provide a sequential-access asynchronous memory, in particular a FIFO, whose consumption and residence time are independent of its size and of its level of fill.

Another object of the invention is to reduce the storage speed and reading speed, whilst not being limited by the size of the memory.

The invention therefore provides a sequential-access asynchronous memory device comprising:
- an asynchronous double-port random access memory,
- a write address generator for delivering to the input port of the memory, in response to write enable signals, successive write address information respectively associated with successive data to be stored sequentially in a predetermined order of writing,
- a read address generator for delivering to the output port of the memory, in response to read enable signals, successive read address information respectively associated with successive data to be read sequentially in a predetermined order of reading,
- means for detecting the stability of the address information delivered by the address generators, and
- means for determining the level of fill of the memory from the stable address information delivered by the address generators.

The use of a double-port random-access memory (or DPRAM) contributes to solving the consumption problem since, at each cycle time, the words stored in the random-access memory are no longer physically shifted as in the case of a register-based memory. In fact, in the case of a FIFO, the address generators, for example synchronous counters, are incremented by 1 each time a word enters the memory and each time a word leaves it. These two counters then directly deliver the addresses of the memory slots of the random-access memory corresponding to the data to be stored or read.

While the address generators are producing new addresses, the reading of the contents of the generators cannot be exploited. Stated otherwise, the address provided by the corresponding generator is not stable.

Now, it is necessary to guarantee that, when the level of fill of the memory is determined from the addresses delivered, these latter, and therefore the level, are stable irrespective of the differences in frequencies and in phases between the input and output clocks. The invention therefore provides, in combination with the random-access memory and the address generators, means for detecting the stability of the addresses delivered, for the purposes of taking them into account when determining the level of fill of the sequential-access memory thus formed.

The invention advantageously provides for the determination of two levels of fill, one in write mode, valid upon rising edges of the input clock signal and the other in read mode, valid upon rising edges of the read clock signal.

Stated otherwise, the stability detection means advantageously include a first elementary detection means delivering a first stability logic signal representative of the stable or unstable nature of a write address produced by the write address generator, and a second elementary detection means delivering a second stability logic signal representative of the stable or unstable nature of a read address produced by the read address generator.

The means for determining the level of fill therefore include a first elementary means of determining the level of fill in write mode from the write address information item delivered by the write address generator and from the read address information item delivered by the read address generator and enabled by the second stability logic signal. They also include a second elementary means of determining the level of fill in read mode from the read address information item delivered by the read address generator and from the write address information item delivered by the write address generator and enabled by the first stability logic signal.

According to one embodiment of the invention, the elementary means of determining the level of fill in write mode includes:
- a first control circuit receiving the clock signal for gating the input port of the memory as well as the second stability logic signal and delivering a first corresponding control logic signal having a first value in the presence of a second stability logic signal representative of the stable nature of the corresponding read address and a second value in the presence of a second stability logic signal representative of the unstable nature of the corresponding read address,
- a first latch means, controlled by the first logic control signal for storing the stable read address provided by the read address generator, and
- a first subtracter connected to the output of the write address generator as well as to the output of the first latch means.

Similarly, the elementary means of determining the level of fill in read mode includes:
- a second control circuit receiving the clock signal for gating the output port of the memory as well as the first stability logic signal and delivering a second corresponding control logic signal having a first value in the presence of a first stability logic signal representative of the stable nature of the corresponding write address and a second value in the presence of a first stability logic signal representative of the unstable nature of the corresponding write address, a second latch means, controlled by the second logic control signal for storing the stable write address provided by the write address generator, and a second subtracter connected to the output of the read address generator as well as to the output of the second latch means.

Each control circuit preferably includes:

a signal input for receiving the corresponding stability logic signal, a clock input for receiving the corresponding gating clock signal, a signal output for delivering the corresponding control logic signal, an auxiliary clock output, connected to the clock input, for delivering an auxiliary gating clock signal to the corresponding address generator, a first D flip-flop, whose control input is connected to the clock input, and whose data input is connected to the signal input, a first NAND logic gate, whose two inputs are connected respectively to the signal input by way of an inverter and to the non-complemented output of the D flip-flop, a second NAND logic gate, whose two inputs are connected respectively to the clock input by way of first chosen delay means, and to the complemented output of the D flip-flop, a third NAND logic gate, whose two inputs are connected respectively to the two outputs of the first and second logic gate, and whose output is connected to the signal output.

Furthermore, each elementary means of determining the level of fill includes a timing circuit, whose input is connected to the output of the third NAND logic gate and whose output is connected to the reset input of the D flip-flop, so as to initialize the control circuit in tempo with the corresponding control logic signal.

This initialization of the first flip-flop in tempo with the control logic signal makes it possible to avoid losing pulses of the control logic signal in certain operating cases.

Each timing circuit advantageously includes a second D flip-flop, whose control input is connected to the signal output of the corresponding control circuit and whose non-complemented output is connected to the reset input by way of second delay means, the respective reset inputs of the two D flip-flops being connected to one another.

Preferably, the auxiliary clock output of each control circuit is connected to the clock input by way of the first delay means, so as to deliver to the corresponding address generator an auxiliary gating clock signal delayed with respect to the gating clock signal by a first predetermined delay.

According to one embodiment of the invention, each elementary means of detection includes a monostable having a third chosen delay, and delivering the corresponding stability logic signal from the corresponding gating clock signal and from the corresponding enable signal.

This third delay is at least equal to the first delay plus the response time of the corresponding address generator.

The subject of the invention is also a process for the asynchronous sequential storage and reading of data in an asynchronous double-port random-access memory, in which:

successive write address information respectively associated with successive data to be stored sequentially in a predetermined order of writing, as well as successive read address information respectively associated with successive data to be read sequentially in a predetermined order of reading, are delivered respectively to the input and output ports of the memory, in response to write and read enable signals, the stable nature of the address information thus delivered is detected, and the level of fill of the memory is determined from this stable address information.

According to one implementation of the invention, a first stability logic signal representative of the stable or unstable nature of a write address produced and a second stability logic signal representative of the stable or unstable nature of a read address produced are delivered, a level of fill in write mode is determined from the write address information item delivered and from the read address information item delivered and enabled by the second stability logic signal, as is a level of fill in read mode from the read address information item delivered and from the write address information item delivered and enabled by the first stability logic signal.

Advantageously, from the signal for gating the input port of the memory and from the second stability logic signal, a corresponding first control logic signal is generated, having a first value in the presence of a second stability logic signal representative of the stable nature of the corresponding read address and a second value in the presence of a second stability logic signal representative of the unstable nature of the corresponding read address, the read address delivered is stored in response to the first logic control signal, this stored address corresponding to a stable read address, the difference is taken between the write address delivered and the stable read address.

Similarly, from the signal for gating the output port of the memory and from the first stability logic signal, a corresponding second control logic signal is generated, having a first value in the presence of a first stability logic signal representative of the stable nature of the corresponding write address and a second value in the presence of a first stability logic signal representative of the unstable nature of the corresponding write address, the write address delivered is stored in response to the second logic control signal, this stored address corresponding to a stable write address, and the difference is taken between the read address delivered and the stable write address.

An auxiliary gating clock signal is preferably delivered, delayed with respect to the corresponding gating clock signal by a first predetermined delay, and the corresponding addresses are delivered in response to the corresponding auxiliary gating clock signal and to the corresponding enable signal.

According to one implementation of the invention, the corresponding stability logic signal is delivered from the corresponding gating clock signal and from the corresponding enable signal, and with a chosen time delay, for example at least equal to the first delay plus the time for producing the corresponding address.

BRIEF DESCRIPTION OF THE DRAWINGS

Other advantages and characteristics of the invention will emerge on examining the detailed description of a wholly non-limiting embodiment, illustrated in the appended drawings in which.

DETAILED DESCRIPTION OF THE INVENTION

Although the invention relates in a general way to sequential-access asynchronous memories, the embodying of a memory of the first-in first-out type (FIFO) will now be described.

Those skilled in the art will readily be able to adapt this description to the embodying of a memory of the last-in first-out type (LIFO).

Figure 1:
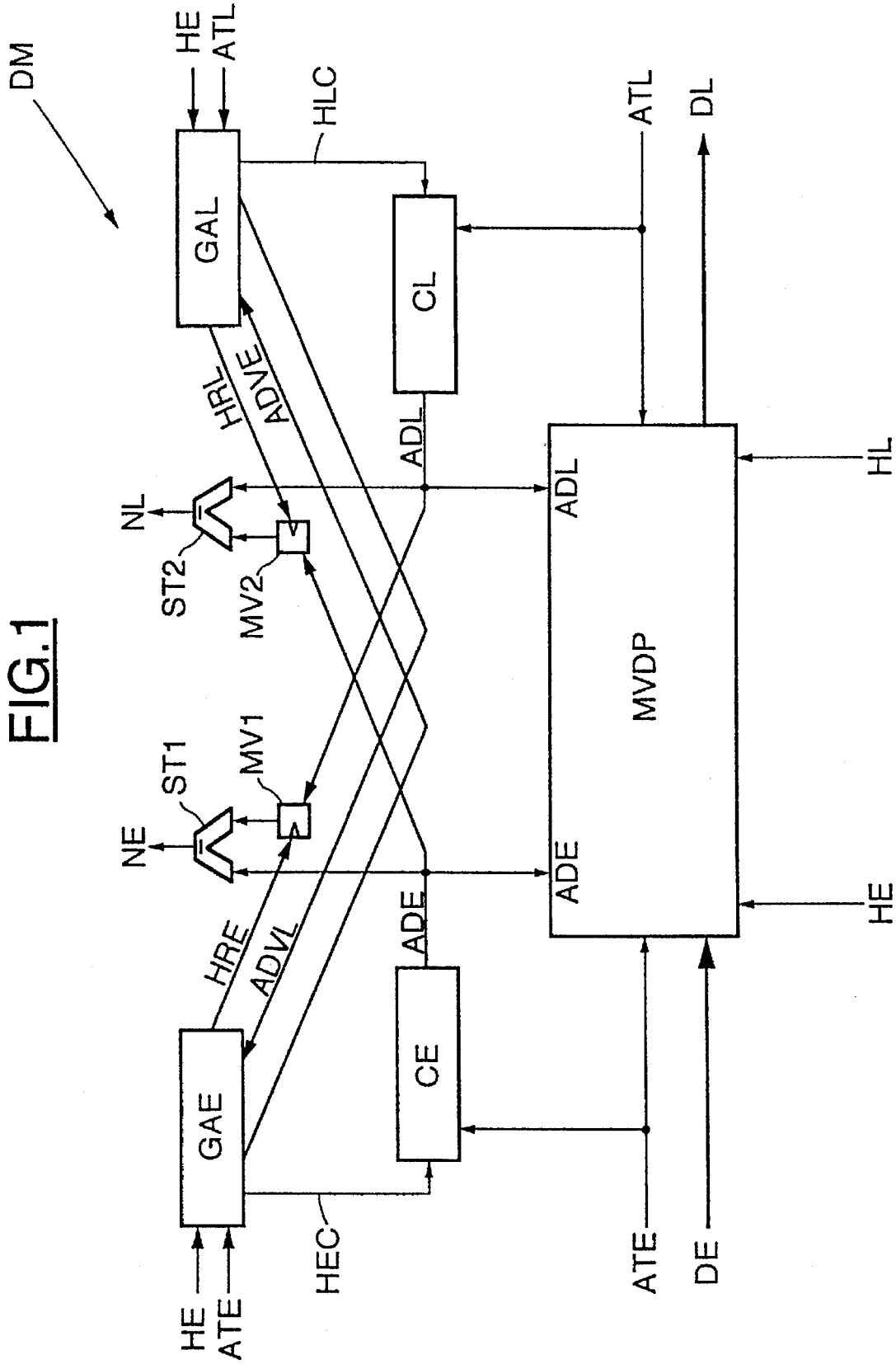
FIG. 1 is a diagrammatic overview of a memory device according to the invention.

In FIG. 1, the reference DM denotes a memory device of the FIFO type, according to the invention. This device DM includes an asynchronous double-port random-access memory, referenced MVDP. This double-port memory includes a write-dedicated port gated by a write clock signal HE and receiving data DE to be written to the memory in a predetermined order, as well as the corresponding write addresses ATE and a write enable or validation signal ATE.

This memory MVDP includes, in similar fashion, a read-dedicated port gated by a read clock signal HL, receiving read addresses ADL corresponding to data DL to be read, in response to a read enable or validation signal ATL, in a predetermined order of reading.

With this memory MVDP are associated a counter CE gated by an auxiliary clock signal HEC, derived from the clock signal HE for gating the input port of the memory, and moreover receiving the write enable signal ATE, in order to deliver the write addresses ADE.

Similarly, a counter CL is provided, gated by an auxiliary clock signal HLC, derived from the clock signal HL for gating the output port of the memory, and moreover receiving the write enable signal ATL, in order to deliver the read addresses ADL.

For operation of the memory device DM in FIFO mode, the address counters CE and CL are incremented by 1, starting from the same initial value, each time a word enters the memory MVDP and each time a word leaves it. These two counters thus deliver successively the consecutive addresses corresponding to the operation of a FIFO. Stated otherwise, the two counters point to the memory slots corresponding to the top and to the bottom of the stack. Thus, at each cycle time, the words stored in the random-access memory are no longer physically shifted as in the case of a register-based FIFO, but directly access either the designated memory cell or the output port.

Furthermore, it is necessary to determine the level of fill of the memory device according to the invention, so as to avoid writing a data item into a full FIFO or reading a data item from an empty FIFO.

This determination is carried out in a general way from the difference between the write and read addresses. Now, it is necessary to guarantee that, at the time this difference is taken, the result is stable irrespective of the differences in frequency and in phases between the two clocks for gating the two ports of the random-access memory.

In the embodiment described here, two levels of fill are in fact determined, one NE valid upon the rising edges of the write clock signal HE and the other NL valid upon the rising edges of the read clock signal HL.

The instants at which the two addresses, write and read, are stable at the same time are given by the rising edges of two control logic signals, respectively referenced HRE for the calculation of the level NE, and HRL for the calculation of the level NL. These two control logic signals HRE and HRL are generated by two identical blocks GAE and GAL which manage, in a general way, the asynchronism of the write and read clock signals respectively.

More precisely, in write mode, the problem of instability in the determination of the level NE originates from the read address information item ADL provided by the counter CL. In fact, when the write counter CE delivers the write address ADE, the latter is by definition stable. On the other hand, when seeking to determine the level NE from this write address ADE and from the read address ADL read from the counter CL, the latter may possibly be updating a new read address.

Similarly, in read mode, the problem of instability in the determination of the level NL results from the write address ADE provided by the counter CE and not from the read address ADL provided by the counter CL which is by definition stable when it is delivered by the latter.

This is why the control logic signal HRE is delivered by the block GAE in response to a stability logic signal ADVL delivered by the block GAL and representative of the activity of the counter CL, that is to say of the exploitable or stable nature of the address ADL provided by the latter.

Similarly, the control signal HRL is delivered by the block GAL in response to a stability logic signal ADVE delivered by the block GAE and representative of the activity, that is to say of the exploitable or stable nature of the write address ADE.

Figure 2:
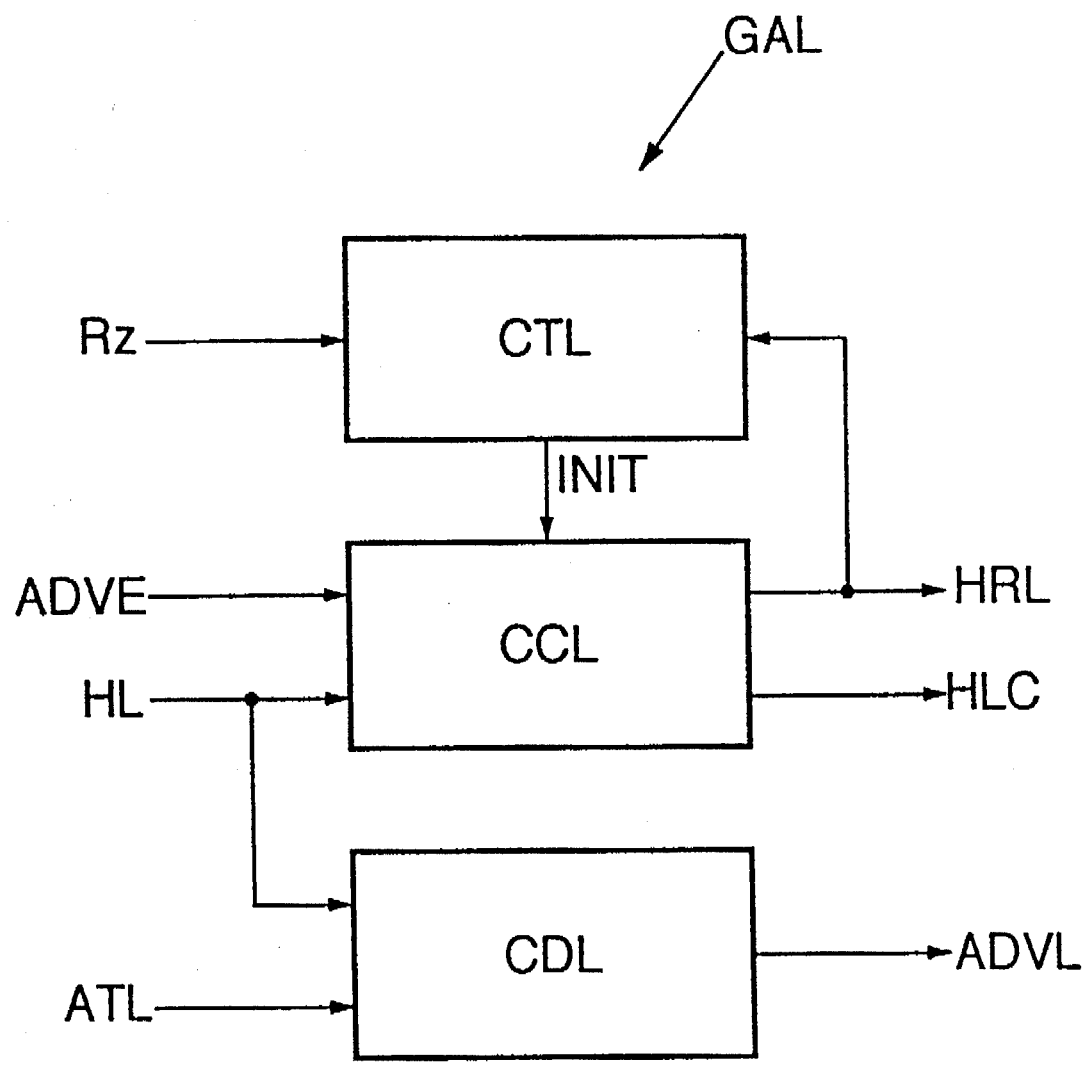
FIG. 2 is a diagrammatic overview of part of the device of FIG. 1.

For purposes of simplification, a single one of the management blocks, namely the block GAL, will now be described while referring more particularly to FIGS. 2 to 4.

This block is composed essentially of a control circuit CCL which delivers the sampling control signal HRL as well as the auxiliary clock signal HLC for incrementing the read address counter CL, an associated timing circuit CTL which, as will be seen in greater detail later, initializes the control circuit CCL after each read cycle and finally a circuit CDL for detecting instability of the read counter.

The timing circuit CCL receives a reset pulse Rz as well as the control signal HRL and delivers a pulse INIT to the control circuit CCL. The latter receives the stability signal ADVE as well as the signal HL for gating the output port of the memory and delivers the signals HRL and HLC. The detection circuit CL also receives the clock signal HL as well as the read validation signal ATL and delivers the stability signal ADVL.

The structure of the block GAE is similar to that of the block GAL. The signals ADVE, HL, HRL, HLC, ATL and ADVL relating to the block GAL are, for the block GAE, replaced respectively by the signals ADVL, HE, HRE, HEC, ATE and ADVE.

Figure 3:
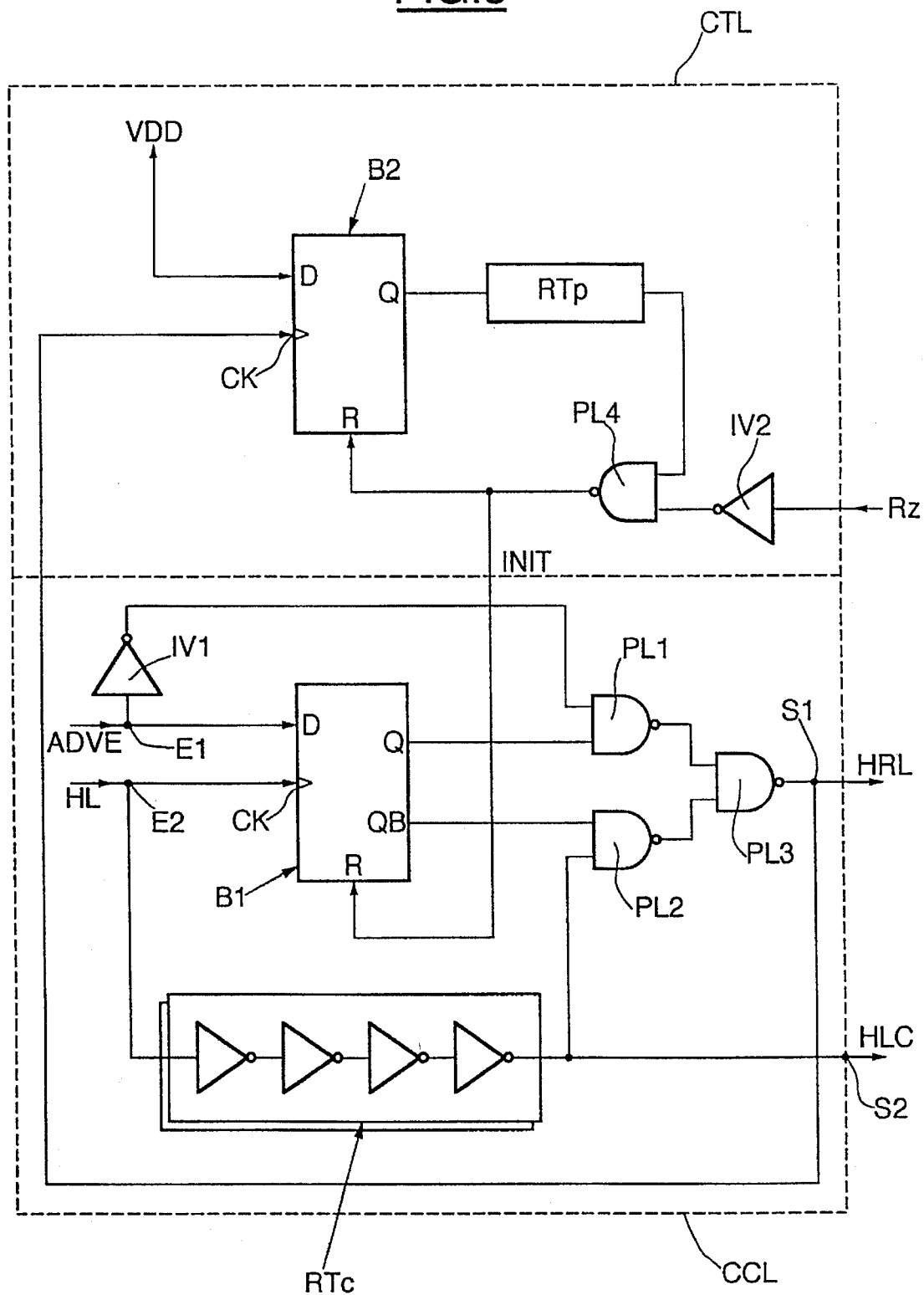
FIG. 3 is an overview diagrammatically illustrating in greater detail two circuits of FIG. 2.
Figure 4:
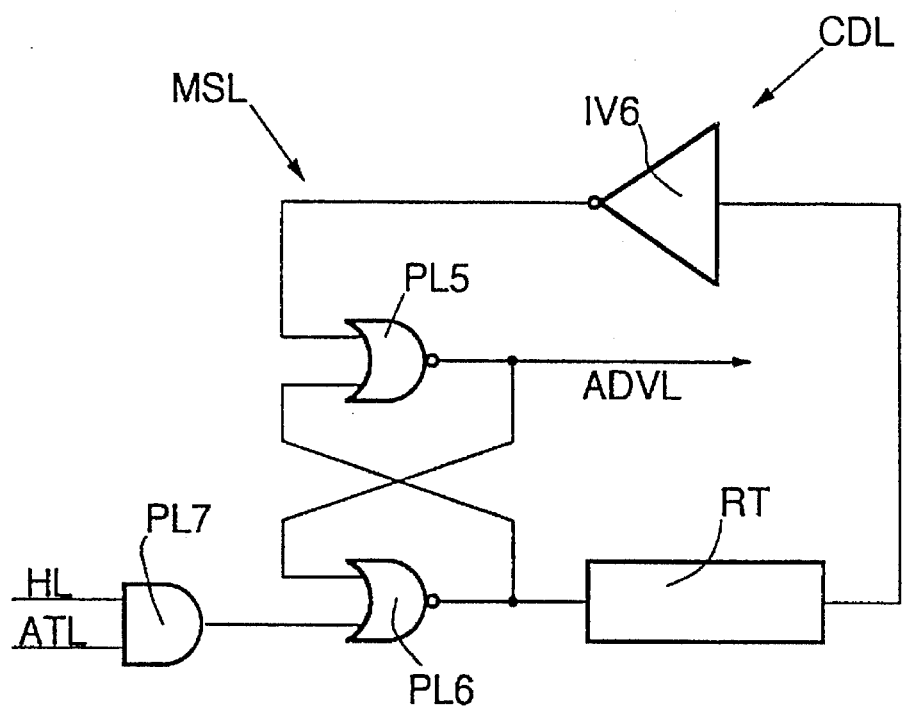
FIG. 4 is a diagrammatic overview illustrating in greater detail another circuit of FIG. 2.

As illustrated in FIG. 3, the control circuit CCL includes an input E1 for the logic signal ADVE for stability of the write address, an input E2 for the clock signal HL for gating the output port of the random-access memory, an output S1 for the control logic signal HRL and an auxiliary output S2 for the auxiliary clock signal HLC for gating the counter CL.

The circuit CCL furthermore includes a first flip-flop B1, whose data input D is connected to the input E1 and whose control input CK is connected to the input E2. The two outputs of this flip-flop B1 are connected to the two inputs of a multiplexer here formed by three NAND logic gates, referenced PL1, PL2, PL3. More precisely, one of the inputs of the first logic gate PL1 is connected to the input E1 by way of an inverter IV1, whereas the other input of this gate PL1 is connected to the non-complemented output Q of the flip-flop B1. One of the inputs of the logic gate PL2 is connected to the complemented output QB of the flip-flop B1, whereas the other input of the logic gate PL2 is connected to the input E2 by way of delay means RTc here embodied by an even-numbered chain of inverters, for example 4. The number of inverters, which must be even for the proper logic operation of the circuit CCL, is set in such a way as to temporally delay the auxiliary clock signal HLC, tapped off at the output of the delay means RTc, by a predetermined time delay Tc relative to the gating clock signal HL.

The outputs of the two logic gates PL1 and PL2 are respectively connected to the two inputs of the third logic gate PL3, whose output is connected to the output S1 of the circuit CCL.

During a read cycle, the circuit CC1 investigates, upon the rising edge of the clock signal HL, the state of the stability signal ADVE. If this signal ADVE is equal to zero, signifying inactivity of the write address counter CE, that is to say stable contents of the latter, then the control signal HRL is equal to the clock signal HL. In the contrary case, the signal HRL waits for the signal ADVE to pass to the value zero, corresponding to the obtaining of stable contents of the counter CE, and then passes to the state 1. Stated otherwise, the signal ADVE is recorded upon the rising edge of the signal HL in the flip-flop B1 which controls the multiplexer PL1–PL3 in such a way as to route to the output S1, either the signal HL if the non-complemented output of the flip-flop B1 is at zero, or the signal ADVE complemented if the non-complemented output Q is at 1.

The delay Tc, introduced on the signal HL, must be chosen greater than or equal to the response time of the flip-flop B1. Thus, the signal HL is delayed before operating the input of the multiplexer so as to avoid the appearance of parasitic pulses on the output S1 which are due to the delay of the control signals Q and QB of the multiplexer. Furthermore, these same delay means, by delaying the auxiliary clock signal HLC relative to the clock signal HL, enable the stability logic signal ADVL, generated by the circuit CDL, to anticipate by a duration equal to Tc, the change of state of the counter CL. A margin of safety is thus achieved in relation to the exploitable nature of the address ADL contained in the counter CL.

The timing circuit CDL includes a second D-type flip-flop, referenced B2, whose data input is connected to the supply voltage VDD and whose non-complemented output Q is fed back to the reset input R by way of the delay means RTp and also by way of a NAND logic gate referenced PL4. The other input of the logic gate PL4 receives the reset pulse Rz by way of an inverter IV2. Finally, the output of the logic gate PL3 of the multiplexer of the circuit CCL is connected to the control input CK of the flip-flop B2.

The output of the logic gate PL4 is also connected to the reset input R of the flip-flop B1 of the circuit CCL.

The timing circuit CTL may be regarded in fact as a monostable which produces a pulse INIT, of duration Tp with each rising edge of the control signal HRL. This pulse INIT controls the reset input of the flip-flop B1 of the control circuit CCL. Such systematic initialization of the flip-flop B1, in tempo with the rising edges of the signal HRL, makes it possible to avoid losing pulses in the HRL signal in certain operating configurations. A check is thus carried out of the width of each pulse of the signal HRL which is at least equal to the delay Tp. Furthermore, this delay Tp obtained here with an odd number of inverters, to allow proper logic operation of the circuit, is here chosen at most equal to a half-period of the signal HL.

Each address counter, in particular the counter CL, is a counter based on flip-flops and gated by the corresponding auxiliary clock signal. The state of the outputs of the flip-flops of each counter thus directly defines the address of the memory cell in which the corresponding data item is to be stored or from which it is to be read. Furthermore, each address counter is operated, that is to say modifies its contents, in response to the read ATL or write ATE validation signal. The instability detection circuit CDL therefore produces, from the clock signal EL and from the enable signal ATL, the stability signal ADVL representative of the activity of the read address counter.

More precisely, the circuit CDL is composed essentially of a monostable MSL made up of two NAND logic gates, referenced PL5 and PL6, which are fed back to one another. The output of the logic gate PL6 is fed back to the other input of the logic gate PL5 by way of delay means RT formed by an even number of inverters, and via another inverter IV6. The output of the logic gate PL5 delivers the signal ADVL, whereas the other input of the logic gate PL6 is connected to the output of an AND logic gate referenced PL7 which receives the clock signal HL and the read enable signal ATL on its two inputs.

The value of the delay T imposed by the delay means RT must be chosen at least equal to the delay Tc plus the response time of the corresponding address counter, here the read counter.

Figure 5:
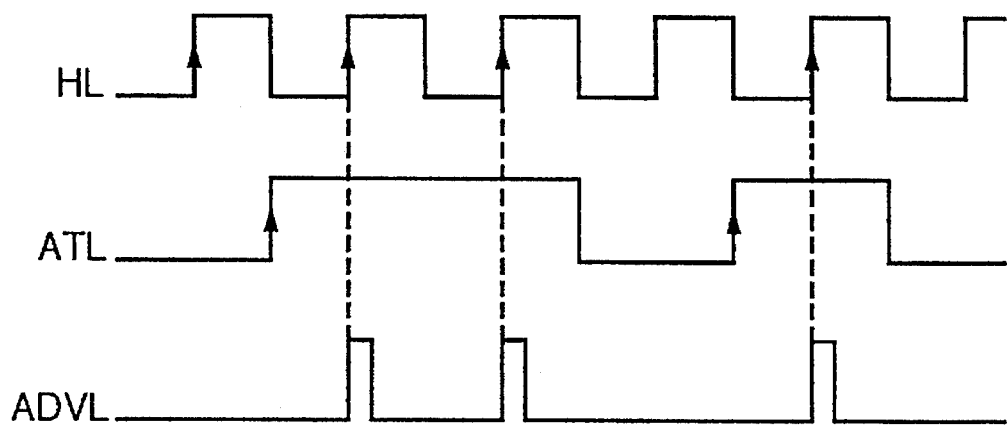
FIG. 5 is an example of a timing diagram for the operation of the circuit of FIG. 4.

FIG. 5 illustrates an example of a timing diagram 7 showing the various pulses of duration T of the signal ADVL relative to the signal ATL and to the rising edge of the gating clock signal HL.

Referring now more particularly to FIG. 1, it is seen that the means for determining the level NE of fill in write mode furthermore include a latch element (MV1) formed here by a D flip-flop. This D flip-flop is controlled by the control logic signal HRE and receives on its data input the read address ADL provided by the counter CL.

The output of this latch element MV1 is connected to one of the inputs of a subtracter ST1, whose other input is connected to the output of the write address counter CE to receive the write address ADE. The output of the subtracter ST1 provides the level of fill in write mode NE.

Similarly, the means for determining the level NL of fill in read mode include a latch element MV2, such as a D flip-flop, which receives on its data input the write addresses ADE provided by the counter CE and which is controlled by the control signal HRL. A subtracter ST2 is input-connected to the output of the latch element MV2 and to the output of the counter CL for outputting the level NL.

During a read cycle, in response to the signals ADVE and HL, the control circuit CCL emits a signal pulse HRL, the effect of this being to store in the flip-flop MV2 the stable address ADE provided by the write counter CE. The level of fill in read mode NL can then be determined and the result will be stable.

Similar operation is obtained during a write cycle for calculation of the level of fill NE from the address ADE provided by the counter CE and from the stable address ADL stored in the flip-flop MV1.

Those skilled in the art will have observed that the value NE of the level of fill in write mode is in fact greater than or equal to the actual level of fill of the stack thus formed. Nevertheless, this is an unimportant deficiency of precision since it effectively guarantees against writing to a full stack.

Furthermore, in symmetrical fashion, determination of the level NL gives a deficient value of the level of fill, this too being an inconsequential lack of precision, since it guarantees against an attempt to read an empty FIFO.

We claim:

1. Sequential-access asynchronous memory device, characterized in that the device comprises:
   an asynchronous double-port random access memory (MVDP),
   a write address generator (CE) for delivering to an input port of the memory, in response to write enable signals (ATE), successive write address information (ADE) respectively associated with successive data (DE) to be stored sequentially in a predetermined order of writing,
   a read address generator (CL) for delivering to an output port of the memory, in response to read enable signals (ATL), successive read address information (ADL) respectively associated with successive data (DL) to be read sequentially in a predetermined order of reading,
   means (CDE, CDL) for detecting the stability of the address information delivered by the write and read address generators, and
   means (GAE, GAL, ST1, ST2) for determining the level of fill of the memory device from the stable address information delivered by the address generators and enabled by the means (CDE, CDL) for detecting the stability of the address information.

2. Device according to claim 1, characterized in that the stability detection means include a first elementary detection means (CDE) delivering a first stability logic signal (ADVE) representative of the stable or unstable nature of a write address (ADE) produced by the write address generator (CE), and a second elementary detection means (CDL) delivering a second stability logic signal (ADVL) representative of the stable or unstable nature of a read address (ADL) produced by the read address generator (CL),
   in that the means for determining the level of fill include a first elementary means (GAE, ST1, MV1) of determining the level (NE) of fill in write mode from the write address information (ADE) delivered by the write address generator (CE) and from the read address information (ADL) delivered by the read address generator (CL) and enabled by the second stability logic signal (ADVL), as well as a second elementary means (GAL, ST2, MV2) of determining the level (NL) of fill in read mode from the read address information item (ADL) delivered by the read address generator (CL) and from the write address information item (ADE) delivered by the write address generator (CE) and enabled by the first stability logic signal (ADVE).

3. Device according to claim 2, characterized in that the elementary means of determining the level of fill in write mode includes:
   a first control circuit receiving a clock signal (HE) for gating the input port of the memory (MVDP) as well as the second stability logic signal (ADVL) and delivering a first corresponding control logic signal (HRE) having a first value in the presence of a second stability logic signal representative of the stable nature of the corresponding read address and a second value in the presence of a second stability logic signal representative of the unstable nature of the corresponding read address,
   a first latch means (MV1), controlled by the first logic control signal (HRE) for storing the stable read address provided by the read address generator, and
   a first subtractor (ST1) connected to the output of the write address generator as well as to the output of the first latch means,
   and in that the elementary means of determining the level of fill in read mode includes:
   a second control circuit (CCL) receiving a second clock signal (HL) for gating the output port of the memory as well as the first stability logic signal (ADVE) and delivering a second corresponding control logic signal (HRL) having a first value in the presence of a first stability logic signal representative of the stable nature of the corresponding write address and a second value in the presence of a first stability logic signal representative of the unstable nature of the corresponding write address,
   a second latch means (MV2), controlled by the second logic control signal for storing the stable write address provided by the write address generator, and
   a second subtractor (ST2) connected to the output of the read address generator as well as to the output of the second latch means.

4. Device according to claim 3, characterized in that each control circuit (CCL) includes:
   a signal input (E1) for receiving the corresponding stability logic signal (ADVE),
   a clock input (E2) for receiving the corresponding gating second clock signal (HL),
   a signal output (S1) for delivering the corresponding control logic signal (HRL),
   an auxiliary clock output (S2), connected to the clock input, for delivering an auxiliary gating clock signal (HLC) to the corresponding address generator (CL),
   a first D flip-flop (B1), whose control input is connect to the clock input, and whose data input (D) is connected to the signal input,
   a first NAND logic gate (PL1), whose two inputs are connected respectively to the signal input by way of an inverter and to the non-complemented output of the D flip-flop (B1),
   a second NAND logic gate (PL2), whose two inputs are connected respectively to the clock input by way of first chosen delay means (RTc), and to the complemented output of the D flip-flop,
   a third NAND logic gate (PL3), whose two inputs are connected respectively to the two outputs of the first and second logic gate, and whose output is connected to the signal output,
   and in that each elementary means of determining the level of fill includes a timing circuit (CTL), whose input is connected to the output of the third NAND logic gate and whose output is connected to the reset input (R) of the D flip-flop (B1), so as to initialize the control circuit in tempo with the corresponding control logic signal (HRL).

5. Device according to claim 4, characterized in that each timing circuit (CTL) includes a second D flip-flop (B2), whose control input (CK) is connected to the signal output (S1) of the corresponding control circuit (CCL) and whose non-complemented output (Q) is connected to the reset input by way of second delay means (RTp), the respective reset inputs of the two D flip-flops being connected to one another.

6. Device according to claim 4, characterized in that the auxiliary clock output (S2) of each control circuit (CCL) is connected to the clock input (E2) by way of the first delay means (RTc), so as to deliver to the corresponding address generator an auxiliary gating clock signal (HLC) delayed with respect to the gating clock signal by a first predetermined delay.

7. Device according to claim 6, characterized in that each elementary means of detection includes a monostable (MSL) having a second chosen delay (T), and delivering the corresponding stability logic signal (ADVL) from the corresponding gating clock signal (HL) and from the corresponding enable signal (ATL).

8. Device according to claim 7, characterized in that the second delay is at least equal to the first delay plus the response time of the corresponding address generator.

9. Device according to claim 1, characterized in that the device forms a memory of the first-in first-out type, the address generators being counters incremented from the same initial value.

10. Process for the asynchronous sequential storage and reading of data in a memory, characterized in that, the memory being an asynchronous double-port random-access memory having input and output ports, successive write address information respectively associated with successive data to be stored sequentially in a predetermined order of writing, as well as successive read address information respectively associated with successive data to be read sequentially in a predetermined order of reading, are delivered respectively to the input and output ports of the memory, in response to write and read enable signals, the stability of the read and write address information thus delivered is detected, and the level of fill of the memory is determined from the stability of the address information detected.

11. Process according to claim 10, characterized in that a first stability logic signal representative of the stable or unstable nature of a write address produced and a second stability logic signal representative of the stable or unstable nature of a read address produced are delivered, a level of fill in write mode is determined from the write address delivered and from the read address delivered and enabled by the second stability logic signal, as is a level of fill in read mode from the read address delivered and from the write address delivered and enabled by the first stability logic signal.

12. Process according to claim 11, characterized in that, from the signal for gating the input port of the memory and from the second stability logic signal, a corresponding first control logic signal is generated, having a first value in the presence of a second stability logic signal representative of the stable nature of the corresponding read address and a second value in the presence of a second stability logic signal representative of the unstable nature of the corresponding read address, the read address delivered is stored in response to the first logic control signal, this stored address corresponding to a stable read address, the difference is taken between the write address delivered and the stable read address, and in that, from the signal for gating the output port of the memory and from the first stability logic signal, a corresponding second control logic signal is generated, having a first value in the presence of a first stability logic signal representative of the stable nature of the corresponding write address and a second value in the presence of a first stability logic signal representative of the unstable nature of the corresponding write address, the write address delivered is stored in response to the second logic control signal, this stored address corresponding to a stable write address, the difference is taken between the read address delivered and the stable write address.

13. Process according to claim 11, characterized in that an auxiliary gating clock signal is delivered, delayed with respect to the corresponding gating clock signal by a first predetermined delay, and in that the corresponding addresses are delivered in response to the corresponding auxiliary gating clock signal and to the corresponding enable signal.

14. Process according to claim 13, characterized in that the corresponding stability logic signal is delivered from the corresponding gating clock signal and from the corresponding enable signal, and with a chosen time delay.

15. Process according to claim 14, characterized in that the time delay is chosen at least equal to the first delay plus the time for producing the corresponding address.

16. Process according to claim 10, characterized in that the data are stored and read in the same order.

* * * * *